US008247096B2

(12) United States Patent
Ugaji et al.

(10) Patent No.: US 8,247,096 B2
(45) Date of Patent: Aug. 21, 2012

(54) NEGATIVE ELECTRODE FOR NON-AQUEOUS ELECTROLYTE SECONDARY BATTERY AND NON-AQUEOUS ELECTROLYTE SECONDARY BATTERY

(75) Inventors: Masaya Ugaji, Osaka (JP); Masahiro Kinoshita, Osaka (JP); Taisuke Yamamoto, Nara (JP); Masaki Deguchi, Hyogo (JP)

(73) Assignee: Panasonic Corporation, Osaka (JP)

( * ) Notice: Subject to any disclaimer, the term of this patent is extended or adjusted under 35 U.S.C. 154(b) by 92 days.

(21) Appl. No.: 12/920,422

(22) PCT Filed: Feb. 12, 2010

(86) PCT No.: PCT/JP2010/000856
§ 371 (c)(1),
(2), (4) Date: Aug. 31, 2010

(87) PCT Pub. No.: WO2010/092815
PCT Pub. Date: Aug. 19, 2010

(65) Prior Publication Data
US 2011/0008673 A1    Jan. 13, 2011

(30) Foreign Application Priority Data

Feb. 13, 2009  (JP) ................................. 2009-031306

(51) Int. Cl.
*H01M 4/60* (2006.01)
*H01M 10/02* (2006.01)
(52) U.S. Cl. ....... 429/47; 429/208; 429/232; 429/231.9; 429/231.95; 429/321; 429/323; 429/338
(58) Field of Classification Search ............... 429/47, 429/208, 232, 231.9, 231.95, 321, 323, 338
See application file for complete search history.

(56) References Cited

U.S. PATENT DOCUMENTS

| 2004/0023116 A1* | 2/2004 | Fujino et al. ............. 429/231.95 |
| 2005/0191556 A1 | 9/2005 | Kim et al. |
| 2006/0099512 A1 | 5/2006 | Nakai et al. |
| 2006/0191794 A1 | 8/2006 | Jarvis |
| 2009/0061325 A1 | 3/2009 | Odani et al. |
| 2009/0092892 A1 | 4/2009 | Yamaguchi et al. |

FOREIGN PATENT DOCUMENTS

| JP | 2005-197258 | 7/2005 |
| JP | 2006-0139967 | 6/2006 |
| JP | 2006-517719 | 7/2006 |
| JP | 2006-216276 | 8/2006 |
| JP | 2008-004534 | 1/2008 |
| JP | 2009-076433 | 4/2009 |
| JP | 2010-010080 | 1/2010 |

* cited by examiner

*Primary Examiner* — Timothy Vanoy
(74) *Attorney, Agent, or Firm* — McDermott Will & Emery LLP

(57) ABSTRACT

In a non-aqueous electrolyte secondary battery 1 including a positive electrode 11, a negative electrode 12, a separator 14, a positive electrode lead 15, a negative electrode lead 16, a gasket 17, and a housing case 18, the negative electrode 12 including a negative electrode active material layer 12b including an alloy-formable active material, a resin layer 13 is formed on the surface of the negative electrode active material layer 12b. The resin layer 13 includes a resin component with lithium ion conductivity and an additive for non-aqueous electrolyte. This configuration enables the battery performance to be maintained at a high level and the battery swelling to be suppressed, even when the number of charge/discharge cycles is increased, providing the non-aqueous electrolyte secondary battery 1 with a high level of safety.

12 Claims, 4 Drawing Sheets

[Fig. 1]
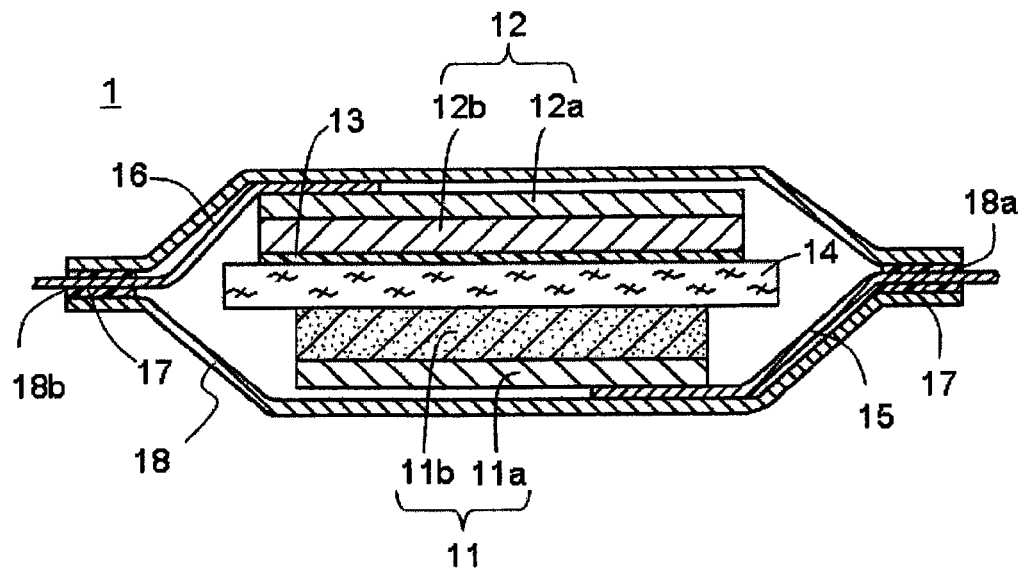
[Fig. 2]
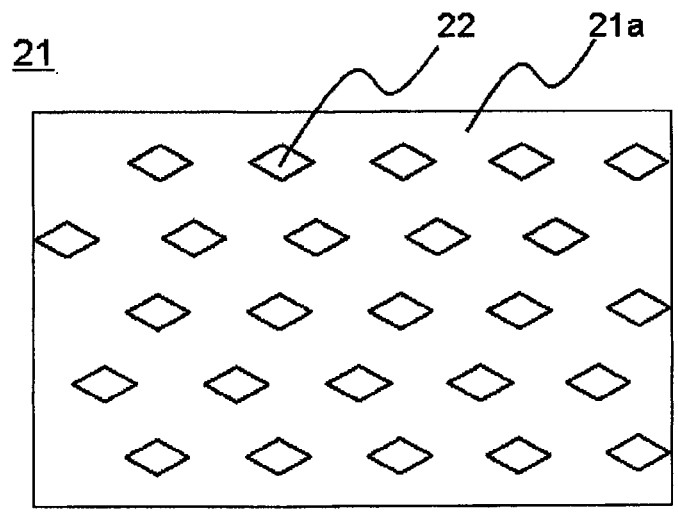

[Fig. 3]
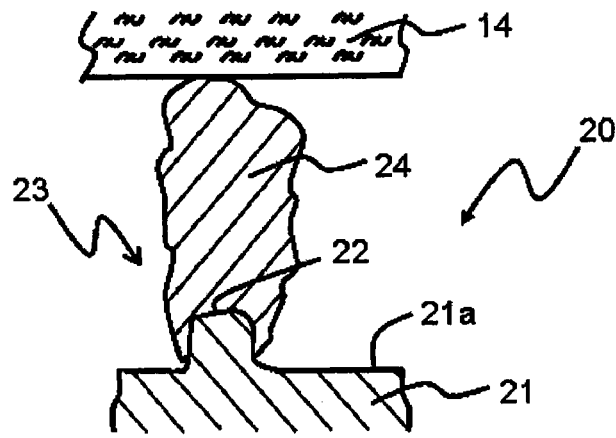
[Fig. 4]
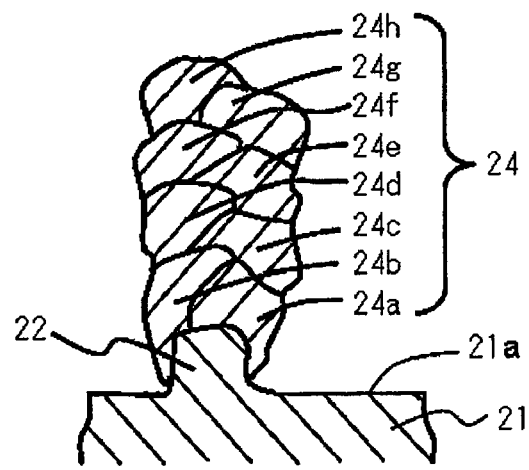
[Fig. 5]
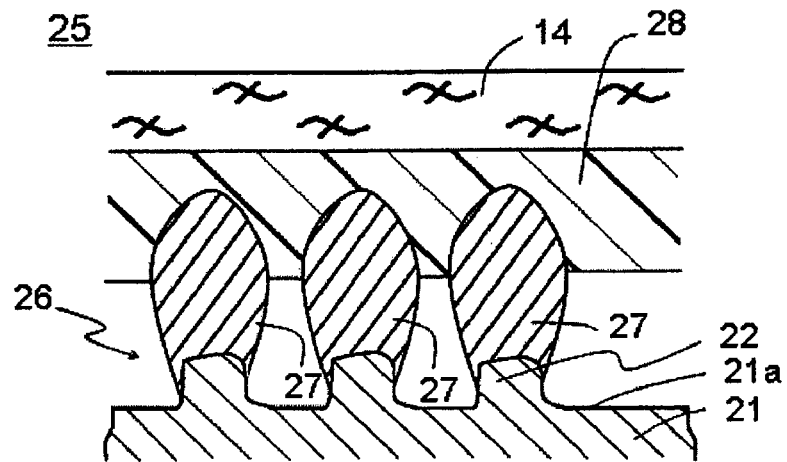

[Fig. 6]
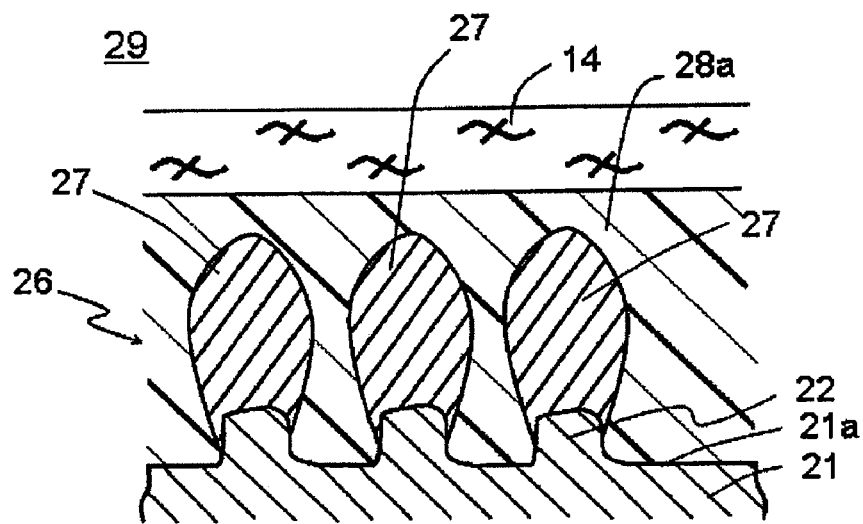
[Fig. 7]
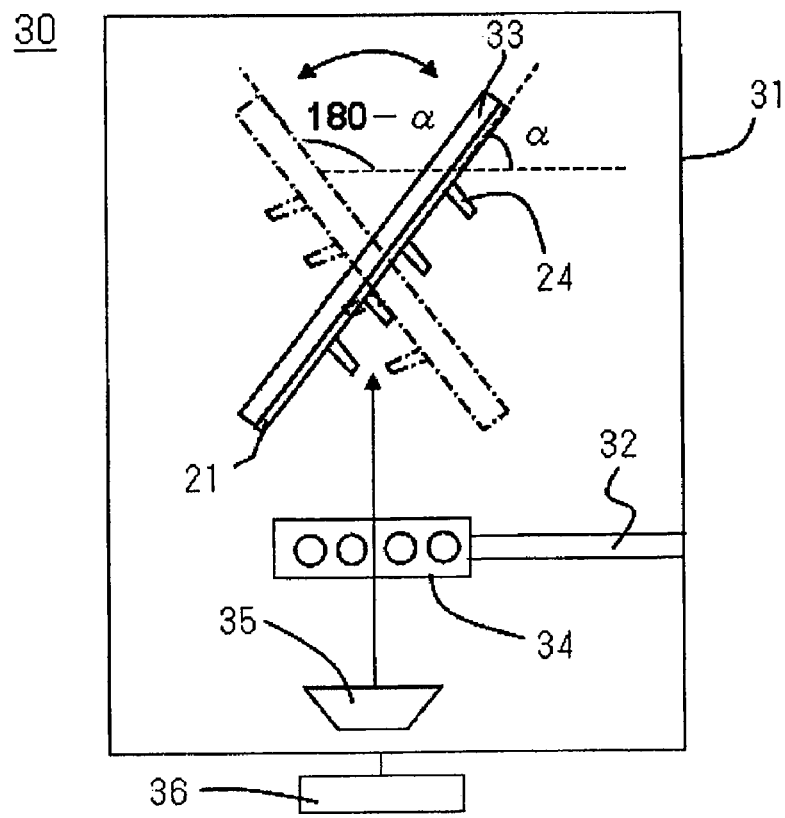

[Fig. 8]
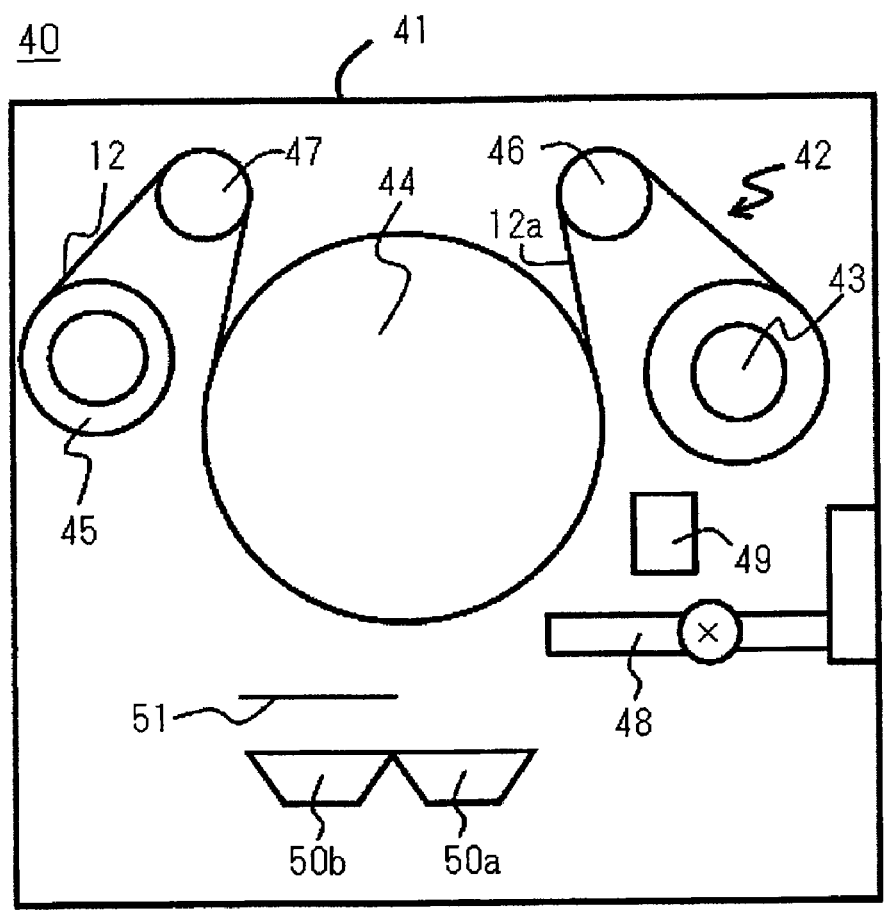

NEGATIVE ELECTRODE FOR NON-AQUEOUS ELECTROLYTE SECONDARY BATTERY AND NON-AQUEOUS ELECTROLYTE SECONDARY BATTERY

RELATED APPLICATIONS

This application is the U.S. National Phase under 35 U.S.C. §371 of International Application No. PCT/JP2010/000856 filed on Feb. 12, 2010, which in turn claims the benefit of Japanese Application No. 2009-031306, filed on Feb. 13, 2009, the disclosures of which Applications are incorporated by reference herein.

TECHNICAL FIELD

The present invention relates to a negative electrode for a non-aqueous electrolyte secondary battery and a non-aqueous electrolyte secondary battery. More specifically, the present invention mainly relates to an improvement of a negative electrode for a non-aqueous electrolyte secondary battery including an alloy-formable active material.

BACKGROUND ART

Non-aqueous electrolyte secondary batteries have a high capacity and a high energy density and can be easily made compact and lightweight, and for this reason, are widely used as a power source for electronic equipment, electric equipment, transportation equipment, machining equipment, power storage equipment, and the like. A typical non-aqueous electrolyte secondary battery is a lithium ion secondary battery including a positive electrode including a lithium-cobalt composite oxide, a negative electrode including graphite, and a separator.

Another known negative electrode active material other than graphite is an alloy-formable active material such as silicon, tin, and an oxide or alloy of silicon or tin. The alloy-formable active material absorbs lithium by alloying with lithium and reversibly absorbs and desorbs lithium. The alloy-formable active material has a high discharge capacity. For example, the theoretical discharge capacity of silicon is about 11 times as large as the theoretical discharge capacity of graphite. Therefore, a non-aqueous electrolyte secondary battery using an alloy-formable active material as the negative electrode active material has a high capacity.

The non-aqueous electrolyte secondary battery using an alloy-formable active material as the negative electrode active material (hereinafter also referred to as the "alloy-type secondary battery") exhibits excellent performance at the beginning of use. However, the problem is that the battery performance deteriorates over time because the electrode deterioration, battery deformation, and the like occur with the increase in the number of charge/discharge cycles. In order to solve this problem, the following proposals have been suggested.

Patent Literature 1 discloses a negative electrode for a non-aqueous electrolyte secondary battery, in which a polymer film layer formed of a polymer support and a cross-linker monomer is provided on the surface of the negative electrode active material layer including lithium alloy particles.

Patent Literature 2 discloses a negative electrode for a non-aqueous electrolyte secondary battery, in which an oxide film composed of an oxide of metal selected from the group consisting of silicon, germanium, and tin is formed on a region of the surface of a negative electrode active material particle being supported on the current collector and containing silicon or tin, the region being brought into contact with the electrolyte.

CITATION LIST

Patent Literature

[PTL 1] Japanese Laid-Open Patent Publication No. 2005-197258
[PTL 2] Japanese Laid-Open Patent Publication No. 2008-004534

SUMMARY OF INVENTION

Technical Problem

The present invention intends to provide a negative electrode for a non-aqueous electrolyte secondary battery including an alloy-formable active material, and a non-aqueous electrolyte secondary battery including the above negative electrode for a non-aqueous electrolyte secondary battery and having excellent life characteristics.

Solution to Problem

A negative electrode for a non-aqueous electrolyte secondary battery of the present invention includes a negative electrode current collector, and a negative electrode active material layer being supported on a surface of the negative electrode current collector and including an alloy-formable active material capable of absorbing and desorbing lithium ions, and further includes a resin layer formed on a surface of the negative electrode active material layer, the resin layer including a resin component with lithium ion conductivity and an additive for non-aqueous electrolyte.

A non-aqueous electrolyte secondary battery of the present invention includes a positive electrode capable of absorbing and desorbing lithium ions, a negative electrode capable of absorbing and desorbing lithium ions, a lithium ion-permeable insulating layer interposed between the positive electrode and the negative electrode, and a lithium ion-conductive non-aqueous electrolyte, wherein the negative electrode is the above-described negative electrode.

Advantageous Effects of Invention

According to the present invention, it is possible to provide a non-aqueous electrolyte secondary battery that includes a negative electrode including an alloy-formable active material and has excellent life characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWINGS

FIG. 1 A longitudinal cross-sectional view schematically showing the configuration of a non-aqueous electrolyte secondary battery of a first embodiment of the present invention.

FIG. 2 A top view schematically showing the configuration of a negative electrode current collector different from the one shown in FIG. 1.

FIG. 3 A longitudinal cross-sectional view schematically showing the configuration of a negative electrode for a non-aqueous electrolyte secondary battery different from the one shown in FIG. 1.

FIG. 4 A longitudinal cross-sectional view schematically showing the configuration of a column included in the negative electrode for a non-aqueous electrolyte secondary battery shown in FIG. 3.

FIG. 5 A longitudinal cross-sectional view schematically showing the configuration of a negative electrode for a non-aqueous electrolyte secondary battery included in a non-aqueous electrolyte secondary battery of a second embodiment of the present invention.

FIG. 6 A longitudinal cross-sectional view schematically showing the configuration of a negative electrode for a non-aqueous electrolyte secondary battery included in a non-aqueous electrolyte secondary battery of a third embodiment of the present invention.

FIG. 7 A side view schematically showing the configuration of an electron beam vacuum vapor deposition apparatus.

FIG. 8 A side view schematically showing the configuration of an electron beam vacuum vapor deposition apparatus different from the one shown in FIG. 7.

DESCRIPTION OF EMBODIMENTS

With regard to the alloy-type secondary batteries, the present inventors have studied the cause of the deterioration in the battery performance over time, and obtained the following findings.

The alloy-formable active material expands and contracts when lithium is absorbed thereto or desorbed therefrom, and generates comparatively large stresses. Because of this, cracks occur at the surface or in the interior of the negative electrode active material layer formed of the alloy-formable active material when the number of charge/discharge cycles is increased. The cracks, if occur, cause surfaces that have not been in direct contact with the non-aqueous electrolyte to appear (hereinafter referred to as "newly-created surfaces").

If the newly-created surfaces and the non-aqueous electrolyte come in contact with each other, side reaction involving the generation of gas occurs at the newly-created surfaces, to produce a by-product and generate gas. The produced by-product causes the electrodes to deteriorate, and the generated gas causes the battery to swell. Further, the side reaction at the newly-created surfaces consumes the non-aqueous electrolyte, and the amount of non-aqueous electrolyte in the battery becomes insufficient, resulting in deterioration in the cycle characteristics.

Based on the foregoing findings, the present inventors have invented a negative electrode in which a resin layer including a resin component with lithium ion conductivity and an additive to be added to the non-aqueous electrolyte (hereinafter simply referred to as a "resin layer") is formed on the surface of the negative electrode active material layer being supported on the surface of the current collector and including an alloy-formable active material.

Since most of the newly-created surfaces are exposed on the surface of the negative electrode active material layer, the contact of the newly-created surfaces with the electrolyte is prevented by forming the resin layer on the surface of the negative electrode active material layer.

In general, the non-aqueous electrolyte used for a non-aqueous electrolyte secondary battery includes a support salt and a non-aqueous solvent, and in addition to these, an additive for non-aqueous electrolyte for improving the battery performance (hereinafter also simply referred to as an "additive"). Such an additive is decomposed on the surface of the positive electrode active material layer or the negative electrode active material layer as the charge/discharge cycles of the battery are repeated, and the concentration of the additive is gradually decreased. As such, although the effect of the additive is sufficiently exerted at the beginning of use of the battery, the effect is reduced as the additive is decomposed with repeated charge/discharge cycles.

In the negative electrode of the present invention, the additive is included in the resin layer formed on the surface of the negative electrode active material layer. Since the additive is retained in the resin layer, the additive is gradually released from the resin layer, when the additive in the non-aqueous electrolyte is decomposed, and the concentration thereof is decreased. As such, the effect of the additive is maintained even when the charge/discharge cycles are repeated.

The additive can be retained at a higher concentration when included in the resin layer than when included in the non-aqueous electrolyte. If the additive is included at a high concentration in the non-aqueous electrolyte, the wettability of the separator with the non-aqueous electrolyte is reduced, the lithium ion conductivity is reduced, or the side reaction becomes more likely to occur. For this reason, allowing the non-aqueous electrolyte to retain the additive at a high concentration is undesirable. In contrast, allowing the resin layer to retain the additive at a high concentration causes no such troubles as described above in the non-aqueous electrolyte, since the additive is gradually supplied to the non-aqueous electrolyte.

A negative electrode for a non-aqueous electrolyte secondary battery of the first embodiment (hereinafter simply referred to as a "negative electrode"), and a non-aqueous electrolyte secondary battery including the negative electrode is described in detail below.

First Embodiment

FIG. 1 is a longitudinal cross-sectional view schematically showing the configuration of a non-aqueous electrolyte secondary battery 1 of the first embodiment of the present invention. The non-aqueous electrolyte secondary battery 1 is a flat battery including a stacked electrode assembly formed by stacking a positive electrode 11 and a negative electrode 12 with a separator 14 interposed therebetween, a positive electrode lead 15 connected to the positive electrode 11, a negative electrode lead 16 connected to the negative electrode 12, gaskets 17 respectively sealing openings 18a and 18b of a housing case 18, and the housing case 18 accommodating the stacked electrode assembly and a non-aqueous electrolyte (not shown).

One end of the positive electrode lead 15 is connected to a positive electrode current collector 11a, and the other end thereof is extended out of the non-aqueous electrolyte secondary battery 1 from the opening 18a of the housing case 18. One end of the negative electrode lead 16 is connected to a negative electrode current collector 12a, and the other end thereof is extended out of the non-aqueous electrolyte secondary battery 1 from the opening 18b of the housing case 18. For the positive electrode lead 15 and the negative electrode lead 16, any positive or negative electrode lead commonly used in the field of lithium ion secondary batteries may be used. For example, an aluminum lead may be used for the positive electrode lead 15; and a nickel lead may be used for the negative electrode lead 16.

The openings 18a and 18b of the housing case 18 are respectively sealed by the gasket 17. For the gasket 17, gaskets made of various resin materials may be used. The housing case 18 may be made of, for example, a metal material, a synthetic resin, or a laminate film. Each of the openings 18*a* and 18*b* of the housing case 18 may be directly sealed without using the gasket 17 by the method such as welding.

The non-aqueous electrolyte secondary battery 1 is fabricated in the following manner. First, one end of the positive electrode lead 15 is connected to the positive electrode current collector 11*a* in the electrode assembly, and one end of the negative electrode lead 16 is connected to the negative electrode current collector 12*a* in the electrode assembly. The electrode assembly is inserted into the housing case 18, the non-aqueous electrolyte is injected into the housing case 18, and the other ends of the positive electrode lead 15 and the negative electrode lead 16 are extended out of the housing case 18. Next, each of the openings 18*a* and 18*b* is sealed by welding with the gasket 17 interposed therebetween while the internal pressure of the housing case 18 is reduced to a near vacuum. The non-aqueous electrolyte secondary battery 1 is thus fabricated.

A detailed description is given first of the negative electrode 12. As shown in FIG. 1, the negative electrode 12 includes the negative electrode current collector 12*a*, a negative electrode active material layer 12*b* supported on the surface of the negative electrode current collector 12*a*, and a resin layer 13 formed on the surface of the negative electrode active material layer 12*b*.

For the negative electrode current collector 12*a*, an electrically conductive substrate is used. The conductive substrate may be made of, for example, a metal material such as stainless steel, titanium, nickel, copper, and a copper alloy. The conductive substrate may be in the form of, for example, metal foil, metal sheet, or metal film. The thickness of the conductive substrate is not particularly limited, but is, for example, 1 to 500 μm and preferably 5 to 50 μm.

The negative electrode active material layer 12*b* includes an alloy-formable active material capable of absorbing and desorbing lithium ions and is formed on one surface or both surfaces of the negative electrode current collector 12*a*. The alloy-formable active material has the following advantage. That is, the alloy-formable active material has a considerably larger capacity than graphite, and therefore, can provide the negative electrode active material layer 12*b* with a sufficient capacity even when the thickness thereof is as small as about 1 μm to several tens μm. In the negative electrode active material layer 12*b* having a thickness as small as about 1 μm to several tens μm, most of the newly-created surfaces, if appear, are exposed on the surface of the negative electrode active material layer 12*b*, and therefore, the newly-created surfaces are sufficiently protected by protecting the surface of the negative electrode active material layer 12*b* with the resin layer 13.

The alloy-formable active material is preferably an amorphous or low crystalline active material that is capable of alloying with lithium by absorbing lithium and is capable of reversibly absorbing and desorbing lithium. Examples of the alloy-formable active material include silicon-based active materials and tin-based active materials. The alloy-formable active materials may be used singly or in combination of two or more.

Examples of the silicon-based active materials include silicon, silicon compounds, partial substitution products, and solid solutions of the silicon compounds or partial substitution products.

Examples of silicon compounds include silicon oxides represented by the formula: $SiO_a$, where $0.05<a<1.95$, silicon carbides represented by the formula: $SiC_b$, where $0<b<1$, silicon nitrides represented by the formula: $SiN_c$, where $0<c<4/3$, and alloys of silicon and a different element (A). Examples of the different element (A) include Fe, Co, Sb, Bi, Pb, Ni, Cu, Zn, Ge, In, Sn, and Ti. The partial substitution products are a compound in which some of the silicon atoms in silicon or a silicon compound are substituted by a different element (B). Examples of the different element (B) include B, Mg, Ni, Ti, Mo, Co, Ca, Cr, Cu, Fe, Mn, Nb, Ta, V, W, Zn, C, N, and Sn. Among these, silicon and silicon compounds are preferred, and silicon oxides are more preferred.

Examples of tin-based active materials include: tin; tin compounds; tin oxides represented by $SnO_d$, where $0<d<2$; tin dioxide ($SnO_2$); tin nitrides; tin alloys such as Ni—Sn alloys, Mg—Sn alloys, Fe—Sn alloys, Cu—Sn alloys, and Ti—Sn alloys; tin compounds such as $SnSiO_3$, $Ni_2Sn_4$, and $Mg_2Sn$; and solid solutions of these. Among the tin-based active materials, tin oxides, tin alloys, and tin compounds are preferred.

The negative electrode active material layer 12*b* supported on the negative electrode current collector 12*a* may be in the form of, for example, a negative electrode active material layer being a negative electrode material mixture layer obtained by applying a material mixture paste including an alloy-formable active material, a conductive agent, and a binder on the surface of the negative electrode current collector 12*a*; a negative electrode active material layer being a film of alloy-formable active material formed on the surface of the negative electrode current collector 12*a* by a vapor phase method; and a negative electrode active material layer including an aggregate of a plurality of columns of alloy-formable active material formed on the surface of the negative electrode current collector 12*a* by a vapor phase method. Among these, a negative electrode active material layer formed by a vapor phase method is preferred, and a negative electrode active material layer including an aggregate of a plurality of columns of alloy-formable active material formed by a vapor phase method is particularly preferred.

Examples of a vapor phase method include vacuum vapor deposition, sputtering, ion plating, laser ablation, chemical vapor deposition (CVD), plasma chemical vapor deposition, and flame spray coating. Among these, vacuum vapor deposition is preferred. The production method of a negative electrode active material layer including an alloy-formable active material by a vapor phase method is described in detail later.

The negative electrode active material layer formed by a vapor phase method, which is one of the above-listed forms of the negative electrode active material layer 12*b*, preferably has a surface with high surface roughness due to the presence of irregularities or voids thereon. When the surface of the negative electrode active material layer has a high surface roughness, the adhesion between the negative electrode active material layer 12*b* and the resin layer 13 is excellent, and the separation of the resin layer 13 is prevented even when the alloy-formable active material undergoes changes in volume.

In particular, in the negative electrode active material layer including an aggregate of a plurality of columns of alloy-formable active material supported on the surface of the negative electrode current collector, there are gaps between the columns. Such roughness and gaps on the surface exhibit an anchor effect with the resin layer 13, improving the adhesion between the negative electrode active material layer 12*b* and the resin layer 13. This prevents the separation of the resin layer 13 from the negative electrode active material layer 12*b* even when the alloy-formable active material repeatedly expands and contracts during repeated charging and discharging. As a result, the effect of the resin layer 13 to protect the newly-created surfaces is maintained.

Further, in the case where a negative electrode active material layer is formed by a vapor phase method and then provided with irregularities or voids on at least part of the surface thereof prior to being assembled, new cracks are unlikely to occur when charging and discharging are repeated, and thus newly-created surfaces are unlikely to appear. As a result, the side reaction caused by the contact of the newly-created surfaces with the non-aqueous electrolyte hardly occurs.

The size of the valleys of the irregularities and the voids provided beforehand on the surface of the negative electrode active material layer formed by a vapor phase method are not particularly limited, but are preferably 0.1 to 20 μm in length, 0.1 to 5 μm in width, and 0.1 to 20 μm in depth. When at least one of the length, width and depth is within the foregoing ranges, the anchor effect works, and the adhesion between the negative electrode active material layer 12b and the resin layer 13 is improved without fail. Further, the occurrence of cracks and appearance of newly-created surfaces during repeated charging and discharging are reduced.

In forming irregularities or voids on the surface of the negative electrode active material layer formed by a vapor phase method, methods such as a deposition method and a surface control method may be employed. According to a deposition method, a film of alloy-formable active material is formed in several steps on the surface of the negative electrode current collector as described later.

According to a surface control method, first, the surface roughness of the negative electrode current collector is increased by, for example, mechanical grinding, chemical etching, electrochemical etching, abrasion with an abrasive, or plating. By forming a negative electrode active material layer by a vapor phase method on the negative electrode current collector having increased surface roughness, the fine irregularities or voids on the surface of the negative electrode current collector are precisely reproduced on the surface of the negative electrode active material layer. The irregularities and the voids are thus provided on the surface of the negative electrode active material layer.

The thickness of the negative electrode active material layer is not particularly limited, but is, for example, 1 to several tens μm, and preferably 1 to 20 μm. When the thickness of the negative electrode active material layer is within such a range, most of the newly-created surfaces appear in the vicinity of the surface of the negative electrode active material layer. As such, the newly-created surfaces will be sufficiently protected by the resin layer 13, and the contact of the newly-created surfaces with the non-aqueous electrolyte is prevented. As a result, the side reaction between the newly-created surfaces and the non-aqueous electrolyte is inhibited.

It should be noted that, prior to forming the resin layer 13 on the surface of the negative electrode active material layer 12b, lithium may be vapor deposited on the negative electrode active material layer 12b in an amount equivalent to an irreversible capacity. The irreversible capacity is an amount of lithium that is stored in the negative electrode active material layer 12b at the first charge/discharge cycle and is not released from the negative electrode active material layer 12b during the subsequent cycles.

Next, a description is given of the resin layer 13 formed on the surface of the negative electrode active material layer 12b.

The resin layer 13 prevents the contact of the newly-created surfaces formed in association with expansion and contraction of the negative electrode active material with the non-aqueous electrolyte. The resin layer 13 includes an additive for non-aqueous electrolyte. The additive for non-aqueous electrolyte included in the resin layer 13 is gradually released into the non-aqueous electrolyte. As such, even when the concentration of the additive for non-aqueous electrolyte included in the non-aqueous electrolyte is decreased during the repeated charge/discharge cycles, the additive for non-aqueous electrolyte is supplied from the resin layer 13 into the non-aqueous electrolyte. Through this mechanism, the life characteristics of the non-aqueous electrolyte secondary battery 1 including the negative electrode 12 including the alloy-formable active material can be improved.

The resin layer 13 includes a resin component with lithium ion conductivity and an additive for non-aqueous electrolyte.

There is no limitation on the resin component with lithium ion conductivity as long as it is a resin component capable of conducting lithium ions. Examples of the resin component capable of conducting lithium ions include a resin component which comes to exhibit lithium ion conductivity when it swells by the contact with the non-aqueous electrolyte, and a resin component to which lithium ion conductivity is imparted by adding a support salt thereto. The resin component to which a support salt is added may or may not have lithium ion conductivity before the addition of the support salt.

Examples of such resin components include fluorocarbon resin, polyacrylonitrile, polyethylene oxide, and polypropylene oxide. These may be used singly or in combination of two or more. Among these, fluorocarbon resin is preferred in view of its good adhesion with the negative electrode active material layer 12b, excellent mechanical strength, and good compatibility with the additive for non-aqueous electrolyte.

Examples of fluorocarbon resin include polyvinylidene fluoride (PVDF), polytetrafluoroethylene (PTFE), and a copolymer of vinylidene fluoride and an olefinic monomer. The properties of the copolymer of vinylidene fluoride and an olefinic monomer can be changed by appropriately selecting the polymerization ratio. Examples of the olefinic monomer include tetrafluoroethylene, hexafluoropropylene (HFP), and ethylene. Among the examples of fluorocarbon resin, PVDF, and a copolymer of vinylidene fluoride (VDF) and HFP are preferred, and a copolymer of VDF and HFP is more preferred. The polymerization ratio of VDF to HFP is not particularly limited, but is preferably VDF:HFP=70:30 to 99.9:0.01 (mass %), and more preferably VDF:HFP=80:20 to 95:5 (mass %).

For the additive for non-aqueous electrolyte, any known additive to be added to non-aqueous electrolyte may be used without limitation. Examples of such an additive include carbonate compounds, sulfur-containing cyclic compounds, acid anhydrides, and nitrile compounds.

Carbonate compounds are an additive capable of forming a coating film with high lithium ion conductivity on the surface of the negative electrode to inhibit the side reaction and thereby to improve the life characteristics of the battery. Examples of carbonate compounds include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate, fluoroethylene carbonate, divinylethylene carbonate, and trifluoropropylene carbonate. These may be used singly or in combination of two or more.

Sulfur-containing cyclic compounds are an additive capable of forming a coating film on the positive electrode to suppress the gas generation in the interior of the battery that occurs in a high temperature environment. A preferred sulfur-containing cyclic compound is a cyclic compound including in the molecule thereof a group $=SO_2$ and an oxygen atom other than oxygen atoms contained in the group $=SO_2$.

Examples thereof include ethylene sulfite and sultones. Examples of sultones include 1,3-propane sultone, 1,4-butane sultone, 1,3-propene sultone, and 1,4-butene sultone. These may be used singly or in combination of two or more.

Acid anhydrides are an additive capable of forming a lithium ion conductive coating film on the negative electrode to inhibit the decomposition by reduction of the non-aqueous solvent. Examples of acid anhydrides include succinic anhydride and maleic anhydride. These may be used singly or in combination of two or more.

Nitrile compounds are an additive to be adsorbed on the surface of the positive electrode, thereby to suppress the gas generation in the interior of the battery that occurs in a high temperature environment. Examples of nitrile compounds include a nitrile compound having a linear alkylene group of 2 to 4 carbon atoms and a cyano group at both ends of the linear alkylene group, such as succinonitrile ($NC-CH_2-CH_2-CN$), glutaronitrile ($NC-CH_2-CH_2-CH_2-CN$), and adiponitrile ($NC-CH_2-CH_2-CH_2-CH_2-CN$).

The content of the additive for non-aqueous electrolyte in the resin layer 13 is appropriately selected according to the type of the additive for non-aqueous electrolyte, and is usually 0.1 to 50% by mass, and preferably 5 to 15% by mass of the total mass of the resin layer 13.

When the content of the additive for non-aqueous electrolyte is too small, the effect of the additive for non-aqueous electrolyte tends not to be maintained over long period of time. When the content of the additive for non-aqueous electrolyte is too large, the mechanical strength and adhesion with the negative electrode active material layer 12b of the resin layer 13 are reduced, and thus, the resin layer 13 tends to be easily separated from the negative electrode active material layer 12b.

A lithium salt may be included as a support salt in the resin layer 13 in order to improve the lithium ion conductivity of the resin layer 13. For the lithium salt, any known lithium salt used as a support salt for a non-aqueous electrolyte secondary battery may be used without limitation. Examples of the lithium salt includes $LiClO_4$, $LiBF_4$, $LiPF_6$, $LiAlCl_4$ $LiSbF_6$, $LiSCN$, $LiCF_3SO_3$, $LiCF_3CO_2$, $LiAsF_6$, $LiB_{10}Cl_{10}$, lithium lower aliphatic carboxylate, $LiCl$, $LiBr$, $LiI$, $LiBCl_4$, borates, and imide salts. These may be used singly or in combination of two or more.

It should be noted that the resin layer 13 with lithium ion conductivity can be obtained without adding a lithium salt. Specifically, the resin layer 13 swells by absorbing the non-aqueous electrolyte, and thus becomes the resin layer 13 with lithium ion conductivity.

The thickness of the resin layer 13 is not particularly limited, but is usually 0.1 to 20 μm, and preferably 1 to 10 μm. When the thickness of the resin layer 13 is too small, it tends to be impossible to sufficiently prevent the contact between the newly-formed surfaces and the non-aqueous electrolyte. Moreover, it tends to be difficult to control the release of the additive for non-aqueous electrolyte from the resin layer 13. When the thickness of the resin layer 13 is too large, the lithium ion conductivity of the resin layer 13 is reduced, causing a possibility of the reduction in the output characteristics, cycle characteristics, storage characteristics, or the like of the battery.

The resin layer 13 can be obtained by, for example, applying a resin solution including a resin component with lithium ion conductivity and an additive for non-aqueous electrolyte onto the surface of the negative electrode active material layer 12b, and drying the resultant coating film. Such a resin solution can be prepared by, for example, dissolving or dispersing the resin component, the additive for non-aqueous electrolyte, and an optionally added lithium salt in an organic solvent. Examples of the organic solvent include carbonates such as dimethyl carbonate, ethyl methyl carbonate, and diethyl carbonate; amides such as dimethylformamide, diethylacetamide, methylformamide, and N-methyl-2-pyrrolidone; dimethylamine; acetone; and cyclohexanone.

The concentration of the resin component in the resin solution is not particularly limited, but is preferably 1 to 10% by mass. When the concentration of the resin component is within this range, the resin layer 13 having a uniform thickness and good adhesion with the surface of the negative electrode active material layer 12b is obtained. When the negative electrode active material layer 12b has gaps or voids, the resin component sufficiently enters the gaps or voids. This allows the anchor effect to work, improving the adhesion between the negative electrode active material layer 12b and the resin layer 13.

The viscosity of the resin solution is preferably 0.1 to 10 cps. The viscosity herein is a viscosity measured at 70° C. with a viscosity/viscoelasticity meter (trade name: RheoStress 600, available from EKO Instruments Co., Ltd.). Adjusting the viscosity of the resin solution within the foregoing range has an advantage in that when the negative electrode active material layer 12b has gaps or voids, a sufficient amount of resin solution can enter the gaps or voids.

When the negative electrode active material layer 12b comprises an aggregate of a plurality of columns of the alloy-formable active material formed by a vapor phase method and supported on the surface of the negative electrode current collector, it is particularly preferable to use a resin solution having a viscosity within the foregoing range. The aggregate of a plurality of columns of the alloy-formable active material has gaps between adjacent columns. When the resin solution has a viscosity within the foregoing range, the resin solution can smoothly enter the gaps. Accordingly, a high level of anchor effect can be obtained due to the presence of gaps between the plurality of columns.

The resin solution is applied onto the surface of the negative electrode active material layer 12b by a known application method. Examples of the application method include screen printing, die coating, comma coating, roll coating, bar coating, gravure coating, curtain coating, spray coating, air knife coating, reverse coating, and dip squeeze coating. The thickness of the resin layer 13 can be adjusted by, for example, changing the applying amount of the resin solution, the content of synthetic resin in the resin solution, and the viscosity of the resin solution.

Next, a detailed description is given of the positive electrode 11. The positive electrode 11 includes the positive electrode current collector 11a, and a positive electrode active material layer 11b supported on the surface of the positive electrode current collector 11a.

For the positive electrode current collector 11a, an electrically conductive substrate is used. The conductive substrate may be made of, for example, a metal material such as stainless steel, titanium, aluminum, and an aluminum alloy, or a conductive resin. The conductive substrate may be in the form of a non-porous plate or a porous plate. Examples of the porous plate include mesh, net, punched sheet, lath, porous body, foam and nonwoven fabric. Examples of the non-porous plate include foil, sheet, and film. The thickness of the conductive substrate is not particularly limited, but is usually 1 to 500 μm and preferably 1 to 50 μm.

The positive electrode active material layer 11b includes a positive electrode active material capable of absorbing and desorbing lithium ions and is formed on one surface or both surfaces of the positive electrode current collector 11a.

For the positive electrode active material, any positive electrode active material capable of absorbing and desorbing lithium ions may be used. Examples of such positive electrode active material include lithium-containing composite oxides, and olivine-type lithium phosphates.

Lithium-containing composite oxides are a metal oxide containing lithium and a transition metal element, or a metal oxide in which part of the transition metal element in the foregoing metal oxide is substituted by a different element.

Examples of the transition metal element include Sc, Y, Mn, Fe, Co, Ni, Cu, and Cr. Preferable examples of the transition metal element include Mn, Co, and Ni.

Examples of the different element include Na, Mg, Zn, Al, Pb, Sb, and B. Preferable examples of the different element include Mg and Al. These transition metal elements may be used singly or in combination of two or more; and these different elements may be used singly or in combination of two or more.

Examples of lithium-containing composite oxides include $Li_lCoO_2$, $Li_lNiO_2$, $Li_lMnO_2$, $Li_lCo_mNi_{1-m}O_2$, $Li_lCo_mM_{1-m}O_n$, $Li_lNi_{1-m}M_mO_n$, $Li_lMn_2O_4$, and $Li_lMn_{2-m}M_nO_4$, where M represents at least one element selected from the group consisting of Sc, Y, Mn, Fe, Co, Ni, Cu, Cr, Na, Mg, Zn, Al, Pb, Sb, and B, $0<l\leq1.2$, $0\leq m\leq0.9$, and $2.0\leq n\leq2.3$. Among these, $Li_lCo_mM_{1-m}O_n$ is preferred.

Examples of olivine-type lithium phosphates include $LiXPO_4$ and $Li_2XPO_4F$, where X represents at least one element selected from the group consisting of Co, Ni, Mn, and Fe.

The number of moles of lithium in each formula above representing a lithium-containing composite oxide or olivine-type lithium phosphate is a value measured immediately after the positive electrode active material is produced, and increases or decreases during charging and discharging. The positive electrode active materials may be used singly or in combination of two or more.

The positive electrode active material layer 11b is formed by, for example, dispersing a positive electrode active material, a binder, a conductive agent, and the like in an organic solvent, to prepare a positive electrode material mixture slurry, applying the prepared slurry onto the surface of the positive electrode current collector 11a, and drying and rolling the resultant coating film.

Examples of the binder include resin materials such as polyvinylidene fluoride, polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, and polyhexafluoropropylene; rubber materials such as styrene-butadiene rubber and modified acrylic rubber; and water-soluble polymer materials such as carboxymethylcellulose.

A copolymer containing two or more monomer compounds may be also used as the resin material. Examples of the monomer compounds include tetrafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene.

These binders may be used singly or in combination of two or more.

The positive electrode active material layer 11b may include a conductive agent as appropriate. Examples of the conductive agent include graphites such as natural graphite and artificial graphite; carbon blacks such as acetylene black, Ketjen black, channel black, furnace black, lamp black, and thermal black; conductive fibers such as carbon fiber and metal fiber; metal powders such aluminum powder; conductive whiskers such as zinc oxide whisker and potassium titanate whisker; conductive metal oxides such as titanium oxide; organic conductive materials such as phenylene derivatives; and fluorinated carbon. These conductive agents may be used singly or in combination of two or more.

Examples of the organic solvent include dimethylformamide, dimethylacetamide, methylformamide, N-methyl-2-pyrrolidone, dimethylamine, acetone, and cyclohexanone.

Next, a detailed description is given of the separator 14.

The separator 14 is an insulating layer that is permeable to lithium ions and is interposed between the positive electrode 11 and the negative electrode 12. Part of the surface of the separator 14 in the side of the negative electrode 12 may be in contact with the surface of the resin layer 13.

The separator 14 may be a porous sheet having pores and predetermined levels of properties such as ion permeability, mechanical strength, and insulating property. Examples of the porous sheet include microporous film, woven fabric, and non-woven fabric. The microporous film may be of a single-layer film or a multi-layer film. The single-layer film is made of one material. The multi-layer film is a laminate of two or more single-layer films. The multi-layer film may be, for example, a laminate of two or more single-layer films made of the same material, or a laminate of two or more single-layer films made of different materials. Alternatively, the multi-layer film may be a laminate of two or more of microporous film, woven fabric, non-woven fabric, and the like.

Although various resin materials may be used as the material for the separator 14, a preferred resin material is polyolefin such as polyethylene and polypropylene, in view of the durability and shutdown function of the separator 14, the safety of the battery, and other factors. The thickness of the separator 14 is usually 10 to 300 μm, and preferably 10 to 30 μm. The porosity of the separator 14 is preferably 30 to 70%, and more preferably 35 to 60%. The porosity is a percentage of the total volume of the pores in the separator 14 to the volume of the separator 14.

The separator 14 is impregnated with a non-aqueous electrolyte with lithium ion conductivity. The non-aqueous electrolyte has various types such as liquid non-aqueous electrolyte and gelled non-aqueous electrolyte.

The liquid non-aqueous electrolyte includes a solute (a supporting salt) and a non-aqueous solvent, and includes various additives as appropriate.

For the solute, any known solute in the field of non-aqueous electrolyte secondary batteries may be used. Examples of the solute include $LiClO_4$, $LiBF_6$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lithium lower aliphatic carboxylates, LiCl, LiBr, LiI, $LiBCl_4$, borates, and imide salts.

Examples of borates include lithium bis(1,2-benzenediolato(2-)-O,O')borate, lithium bis(2,3-naphthalenediolato (2-)-O,O')borate, lithium bis(2,2'-biphenyldiolato(2-)-O,O') borate, and lithium bis(5-fluoro-2-olato-1-benzene sulfonato (2-)-O,O')borate.

Examples of imide salts include lithium bistrifluoromethanesulfonyl imide $((CF_3SO_2)_2NLi)$, lithium trifluoromethanesulfonyl nonafluorobutanesulfonyl imide $((CF_3SO_2)(C_4F_9SO_2)NLi)$, and lithium bispentafluoroethanesulfonyl imide $((C_2F_5SO_2)_2NLi)$.

These solutes may be used singly or in combination of two or more. The concentration of the solute in the non-aqueous solvent is preferably 0.5 to 2 mol/L.

Examples of the non-aqueous solvent include cyclic carbonic acid esters, chain carbonic acid esters, cyclic carboxylic acid esters and the like. Examples of cyclic carbonic acid esters include propylene carbonate, ethylene carbonate and the like. Examples of chain carbonic acid esters include diethyl carbonate, ethyl methyl carbonate, dimethyl carbonate and the like. Examples of cyclic carboxylic acid esters include γ-butyrolactone, γ-valerolactone and the like. These non-aqueous solvents may be used singly or in combination of two or more.

The additive includes the above-described additive for non-aqueous electrolyte, and an additive that inactivates the battery (hereinafter referred to as an "inactivator"). An exemplary inactivator is a benzene compound having a phenyl group and a cyclic compound group adjacent to the phenyl group. The cyclic compound group is, for example, phenoxy group, cyclic ether group, cyclic ester group, cycloalkyl group, and phenoxy group. Examples of the benzene compound include cyclohexyl benzene, biphenyl, and diphenyl ether. These additives may be used singly or in combination of two or more.

The gelled non-aqueous electrolyte includes a liquid non-aqueous electrolyte and a resin material. Examples of the resin material include polyvinylidene fluoride, a copolymer of vinylidene fluoride and hexafluoropropylene, polytetrafluoroethylene, polyacrylonitrile, polyethylene oxide, polyvinyl chloride, and polyacrylate.

When an additive for non-aqueous electrolyte is added to a gelled non-aqueous electrolyte, the gelled non-aqueous electrolyte can be used as the resin layer 13 by, for example, preparing a gelled non-aqueous electrolyte including an additive for non-aqueous electrolyte, and applying the prepared gelled non-aqueous electrolyte onto the surface of the negative electrode active material layer 12b, followed by heating to remove an appropriate amount of the non-aqueous solvent in the gelled non-aqueous electrolyte. In such a manner, the gelled non-aqueous electrolyte serving as the resin layer 13 is formed on the surface of the negative electrode active material layer 12b.

Alternatively, the gelled non-aqueous electrolyte serving as the resin layer 13 can be formed by using the negative electrode 12 including the negative electrode active material layer 12b with the resin layer 13 formed thereon to form an electrode assembly, and housing this electrode assembly into a battery case, followed by injection of a liquid non-aqueous electrolyte into the battery case. Upon injection, the resin layer 13 on the surface of the negative electrode active material layer 12b is gelled, and thus the gelled non-aqueous electrolyte serving as the resin layer 13 is formed.

Although the separator 14 is used as the lithium ion-permeable insulating layer in this embodiment, this is not a limitation, and an inorganic oxide particle layer may also be used. The separator 14 may be used in combination with an inorganic oxide particle layer. The inorganic oxide particle layer functions as the lithium ion-permeable insulating layer and improves the safety of the battery in the event of short circuiting. Using the separator 14 in combination with an inorganic oxide particle layer significantly improves the durability of the separator 14. The inorganic oxide particle layer may be formed on at least one of the surface of the positive electrode active material layer lib and the surface of the negative electrode active material layer 12b, but is preferably formed on the surface of the positive electrode active material layer 11b.

The inorganic oxide particle layer includes a particulate inorganic oxide and a binder. Examples of the inorganic oxide include alumina, titania, silica, magnesia, and calcia. For the binder, the same binder as used in forming the positive electrode active material layer may be used. The particulate inorganic oxides may be used singly or in combination of two or more; and the binders may be used singly or in combination of two or more. The content of the particulate inorganic oxide(s) in the inorganic oxide particle layer is preferably 90 to 99.5% by mass of the total mass of the inorganic oxide particle layer, and more preferably 95 to 99% by mass, with the balance being the binder.

The inorganic oxide particle layer can be formed in the same manner as the positive electrode active material layer 11b. For example, the inorganic oxide particle layer is formed by dissolving or dispersing an inorganic oxide and a binder in an organic solvent to prepare a slurry, applying the prepared slurry onto the surface of the positive electrode active material layer 11b or the negative electrode active material layer 12b, and then drying the resultant coating film. The organic solvent used here may be the same organic solvent as included in the positive material mixture slurry. The thickness of the inorganic oxide particle layer is preferably 1 to 10 μm.

Although the separator 14 is used as the lithium ion-permeable insulating layer in this embodiment, a solid electrolyte layer may be used in place of the separator 14. In the case of using a solid electrolyte layer, usually, it is not necessary to use a non-aqueous electrolyte; however, a non-aqueous electrolyte and a solid electrolyte may be used in combination in order to further improve the lithium ion conductivity in the battery. The solid electrolyte layer includes a solid electrolyte. Examples of the solid electrolyte are classified into inorganic solid electrolytes and organic solid electrolytes.

Examples of the inorganic solid electrolytes include sulfide-based inorganic solid electrolyte, oxide-based inorganic solid electrolyte, and other inorganic solid electrolytes except the sulfide-based and oxide-based ones. The solid electrolyte layer including an inorganic solid electrolyte can be formed by, for example, vapor deposition, sputtering, laser ablation, gas deposition, or aerosol deposition.

Examples of the organic solid electrolyte include ion conductive polymers and polymer electrolytes. The ion conductive polymers are exemplified by polyether with low phase transition temperature, amorphous vinylidene fluoride copolymer, and blends of different polymers. The polymer electrolytes are composed of a matrix polymer and a lithium salt. The matrix polymer may be, for example, polyethylene oxide, polypropylene oxide, a copolymer of ethylene oxide and propylene oxide, and polycarbonate. The lithium salt may be the same lithium salt as included in the liquid non-aqueous electrolyte.

Next, a detailed description is given of an exemplary method of forming a negative electrode 20 used in place of the negative electrode 21, the negative electrode 20 being obtained by forming a negative electrode active material layer 23 comprising an aggregate of a plurality of columns 24 of alloy-formable active material formed on the surface of the negative electrode current collector 21 by a vapor phase method.

FIG. 2 is a top view schematically showing the configuration of the negative electrode current collector 21. FIG. 3 is a longitudinal cross-sectional view schematically showing the configuration of the negative electrode 20 including the negative electrode current collector 21 with the column 24 of alloy-formable active material formed on the surface thereof. FIG. 4 is a longitudinal cross-sectional view schematically showing the configuration of the column 24 included in the negative electrode 20. FIG. 7 is a side view schematically showing the configuration of an electron beam vacuum vapor deposition apparatus 30.

The negative electrode 20 includes the negative electrode current collector 21, and the negative electrode active material layer 23 including a plurality of the columns 24. The negative electrode active material layer 23 is an aggregate of a plurality of the columns 24.

As shown in FIGS. 2 and 3, the negative electrode current collector 21 is provided with a plurality of protrusions 22 on its surface.

The protrusions 22 are protrusions extending outward from a surface 21a of the negative electrode current collector 21 (hereinafter simply referred to as a "surface 21a"). The protrusions 22 are arranged on the surface 21a in a staggered pattern in this embodiment as shown in FIG. 2, but not limited thereto, and may be arranged in other patterns such as a close-packed pattern and a grid pattern.

The height of the protrusions 22 is preferably 3 to 10 μm on average. The height of the protrusion 22 is determined on a cross section of the negative electrode current collector 21 in its thickness direction. The cross section of the negative electrode current collector 21 is a cross section thereof including an uppermost endpoint of the protrusion 22 in its extending direction. The height of protrusion 22 is the length of a perpendicular drawn from the uppermost endpoint to the surface 21a, on the cross section of the negative electrode current collector 21. The average height of the protrusions 22 is determined, for example, by observing the cross section of the negative electrode current collector 21 under a scanning electron microscope to measure the heights of one hundred protrusions 22, and averaging the measured values.

The width of the protrusions 22 is preferably 1 to 50 μm. The width of the protrusion 22 is the longest length of the protrusion 22 measured parallel to the surface 21a, on the cross section of the negative electrode current collector 21. The width of the protrusions 22 can be measured in the same manner as the height of the protrusions 22, by measuring the widths of one hundred protrusions 22, and averaging the measured values. It should be noted that all of a plurality of the protrusions 22 need not to have the same height and/or the same width.

The shape of the protrusion 22 is a rhomboid in this embodiment, but not limited thereto, and may be, for example, a circle, a polygon, an ellipse, a parallelogram, and a trapezoid. The shape of the protrusion 22 is a shape of the protrusion 22 on an orthographic view thereof viewed from vertically above while the surface 21a is aligned with the horizontal plane.

The top of the protrusion 22 (the tip end of the protrusion 22 in the growth direction thereof) is a flat surface in this embodiment, and the flat surface is almost parallel to the surface 21a. The flat surface may have a micron-scale or nano-scale roughness. The bonding strength between the protrusion 22 and the column 24 is enhanced due to the top of the protrusion 22 being a flat surface. The bonding strength is further enhanced due to the flat surface being almost parallel to the surface 21a.

The number of the protrusions 22 and the axis-to-axis distance between the protrusions 22 are selected according to the size of the protrusion 22 (e.g., the height, the width), the size of the column 24 formed on the surface of the protrusion 22, and the like. The number of the protrusions 22 is preferably 10,000/cm² to 10,000,000/cm². The axis-to-axis distance between the protrusions 22 is preferably 2 μm to 100 μm.

When the shape of the protrusion 22 is a circle, the axis of the protrusion is a virtual line passing through the center of the smallest perfect circle that can enclose the circle and extending perpendicularly to the surface 21a. When the shape of the protrusion 22 is an ellipse, the axis of the protrusion 22 is a virtual line passing through the point of intersection of the long and short axes of the ellipse and extending perpendicularly to the surface 21a. When the shape of the protrusion 22 is a shape having diagonals, such as a rhomboid, a polygon, a parallelogram, and a trapezoid, the axis of the protrusion 22 is a virtual line passing through the point of intersection of the diagonals of the shape and extending perpendicularly to the surface 21a.

The protrusion 22 may have at least one projection on its surface (including the top and the side). This further enhances the bonding strength between the protrusion 22 and the column 24, and more effectively prevents the separation of the column 24 from the protrusion 22. The projection extends outward from the surface of the protrusion 22, and is smaller in size than the protrusion 22. The three-dimensional shape of the projection is, for example, a cylinder, a prism, a cone, a pyramid, a needle, or a pleat (a ridge shape extending one direction). The pleat-like projection formed on the side of the protrusion 22 may extend either in the circumferential direction or in the growth direction of the protrusion 22.

The negative electrode current collector 21 can be produced by utilizing a technique of forming roughness on a metal plate. Examples of the metal plate include metal foil, metal sheet, and metal film. The metal plate may be made of a metal material such as stainless steel, titanium, nickel, copper, and copper alloy. An exemplary technique of forming roughness on a metal plate is a roller method.

According to a roller method, a roller having a plurality of recesses formed on its surface (hereinafter referred to as a "protrusion-forming roller") is used to mechanically press a metal plate. This provides the negative electrode current collector 21 in which the protrusions 22 corresponding to the size of the recess, the shape of the internal space thereof, the number and arrangement of the recesses are formed on the surface of the metal plate.

When two protrusion-forming rollers are press-fitted to each other, with the axes of the two rollers being arranged parallel to each other so that a press fit portion is formed therebetween, and a metal sheet is passed through the press fit portion, the negative electrode current collector 21 having the protrusions 22 formed on both surfaces thereof in its thickness direction is provided. When a protrusion-forming roller and a roller with smooth surface are press-fitted to each other, with the axes of the two rollers being arranged parallel to each other so that a press fit portion is formed therebetween, and a metal sheet is passed through the press fit portion, the negative electrode current collector 21 having the protrusions 22 formed on one surface thereof in its thickness direction is provided. The press fitting pressure of the rollers is appropriately selected according to the material and thickness of the metal plate, the shape and size of the protrusions 22, the setting value of the thickness of the negative electrode current collector 21, and the like.

The protrusion-forming roller is a ceramic roller having recesses formed on its surface. The ceramic roller includes a core roller and a flame sprayed layer. For the core roller, a roller such as an iron roller and a stainless steel roller may be used. The flame sprayed layer is formed by flame spraying a ceramic material such as chromium oxide uniformly on the surface of the core roller. The recesses are formed on the flame sprayed layer. In forming recesses, a laser used for processing a ceramic material and the like may be used.

A different type of protrusion-forming roller includes a core roller, a base layer, and a flame sprayed layer. The core roller is the same core roller as included in the ceramic roller. The base layer is a resin layer formed on the surface of the core roller, and the recesses are formed on the surface of the base layer. The base layer is formed by forming recesses on one surface of the resin sheet, and attaching and bonding the resin sheet around the core roller such that the surface of the resin sheet with no recess formed thereon contacts with the surface of the core roller.

The base layer is made of a synthetic resin with high mechanical strength. Examples of such a synthetic resin include thermosetting resins such as unsaturated polyester, thermosetting polyimide, and epoxy resin; and thermoplastic resins such as polyamide, polyether ketone, polyether ether ketone, and fluorocarbon resin.

The flame sprayed layer is formed by flame spraying a ceramic material such as chromium oxide on the base layer along the roughness on the surface thereof. For this reason, it is preferable to form the recesses on the base layer so as to have a size larger than the design size of the protrusions 22, by an amount corresponding to the thickness of the flame sprayed layer.

Another different type of protrusion-forming roller includes a core roller and a cemented carbide layer. The core roller is the same core roller as included in the ceramic roller. The cemented carbide layer is formed on the surface of the core roller and includes cemented carbide such as tungsten carbide. The cemented carbide layer can be formed by thermal fitting or cool fitting. In the thermal fitting, a cylinder of cemented carbide is warmed to expand, into which the core roller is inserted. In the cool fitting, the core roller is cooled to shrink, and inserted into the cylinder of cemented carbide. The recesses are formed on the surface of the cemented carbide layer by, for example, laser machining.

Yet another type of protrusion-forming roller is a hard iron-based roller having recesses formed on its surface. The hard iron-based roller is a roller in which at least the surface layer thereof is made of high-speed steel, forged steel, and the like. The high-speed steel is an iron-based material made by adding a metal such as molybdenum, tungsten, and vanadium to iron, followed by heating to increase the hardness. The forged steel is an iron-based material made by heating a steel ingot or steel slab, and then tempering and molding it by forging or by rolling and forging, followed by further heating. The steel ingot is made by casting molten steel using a mold. The steel slab is formed from the steel ingot. The forging is performed by using a press or hammer. The recesses are formed by laser machining.

The negative electrode active material layer 23 includes a plurality of the columns 24 as shown in FIG. 3. The column 24 extends outward from the surface of the protrusion 22 on the negative electrode current collector 21. The column 24 grows in a direction perpendicular to the surface 21a or in a direction inclined from the perpendicular to the surface 21a. Gaps are present between a pair of the columns 24 adjacent to each other. The gaps absorb the stress generated due to changes in volume of the alloy-formable active material. As a result, the separation of the column 24 from the protrusion 22, the deformation of the negative electrode current collector 21 and the negative electrode 20, and the like are prevented.

The column 24 is preferably a stack of eight columnar pieces 24a, 24b, 24c, 24d, 24e, 24f, 24g and 24h, as shown in FIG. 4. Specifically, the column 24 is formed as follows. First, the columnar piece 24a is formed so as to cover the top of the protrusion 22 and part of the side surface continued therefrom. Then, the columnar piece 24b is formed so as to cover the remaining part of the side surface of the protrusion 22 and part of the top surface of the columnar piece 24a. That is, in FIG. 4, the columnar piece 24a is formed on one edge of the protrusion 22 that includes the top of the protrusion 22. The columnar piece 24b is formed on the other edge of the protrusion 22 with part of the columnar piece 24b overlapping the columnar piece 24a.

The columnar piece 24c is formed so as to cover the remaining part of the top surface of the columnar piece 24a and part of the top surface of the columnar piece 24b. In other words, the columnar piece 24c is formed so as to be mainly in contact with the columnar piece 24a. Further, the columnar piece 24d is formed so as to be mainly in contact with the columnar piece 24b. By stacking the columnar pieces 24e, 24f, 24g and 24h one after another in the same manner as described above, the column 24 is formed. The number of stacked columnar pieces is not limited to eight, and may be any number of two or more.

The column 24 can be formed by, for example, an electron beam vapor deposition apparatus 30 as shown in FIG. 7 (herein after simply referred to as a "vapor deposition apparatus 30"). In FIG. 7, the members in the interior of the vapor deposition apparatus 30 are illustrated by a solid line. The vapor deposition apparatus 30 includes a chamber 31, a first pipe 32, a support table 33, a nozzle 34, a target 35, an electron beam generator (not shown), a power source 36, and a second pipe (not shown).

The chamber 31 is a pressure-resistant container and accommodates in its interior the first pipe 32, the support table 33, the nozzle 34, the target 35, and the electron beam generator.

One end of the first pipe 32 is connected to the nozzle 34, and the other end thereof extends outside the chamber 31 and is connected to a raw material gas tank or raw material gas producing apparatus (not shown) via a mass flow controller (not shown). The first pipe 32 supplies a raw material gas to the nozzle 34. The raw material gas is, for example, oxygen or nitrogen.

The support table 33 is a pivotally-supported plate-like member and is capable of holding the negative electrode current collector 21 on one surface thereof in its thickness direction. The support table 33 is tilted alternately so as to move between the positions indicated by the solid line and by the dot-dash line. The position indicated by the solid line is a position where the support table 33 forms an angle $\alpha°$ with the horizontal line. The position indicated by the dash-dot line is a position where the support table 33 forms an angle $(180-\alpha)°$ with the horizontal line. The angle $\alpha°$ is appropriately selected according to the size and shape of the column 24, the number of stacked columnar pieces, and other factors.

The nozzle 34, to which on end of the first pipe 32 is connected, is disposed between the support table 33 and the target 35 and discharges a raw material gas. The target 35 accommodates a raw material of alloy-formable active material. The electron beam generator irradiates the raw material of alloy-formable active material accommodated in the target 35 with electron beams, to heat the raw material. This generates vapor of the raw material of alloy-formable active material. The vapor goes up toward the negative electrode current collector 21 and is mixed with the gas discharged from the nozzle 34.

The power source 36 is disposed outside the chamber 31 and applies a voltage to the electron beam generator. The second pipe introduces a gas to be the atmosphere in the chamber 31. An electron beam vapor deposition apparatus having the same configuration as that of the vapor deposition apparatus 30 is commercially available from, for example, Ulvac Inc.

In using the vapor deposition apparatus 30, first, the negative electrode current collector 21 is fixed on the support table 33, and oxygen gas is introduced into the chamber 31. Next, the target 35 is irradiated with electron beams, to generate vapor of the raw material of alloy-formable active material therefrom. In this embodiment, the raw material of alloy-formable active material is silicon. The vapor goes up vertically upward and is mixed with the raw material gas in the vicinity of the nozzle 34. The mixed gas of the vapor and the raw material gas further goes up to be supplied to the surface of the negative electrode current collector 21 fixed on the support table 33. Consequently, a layer including silicon and oxygen is formed on the surfaces of the protrusions 22 (not shown).

In this process, the columnar pieces 25a as shown in FIG. 4 are formed on the surfaces of the protrusions while the support table 33 is set at the position indicated by the solid line. Then, the support table 33 is tilted to the position indicated by the dot-dash line, and the columnar pieces 25b as shown in FIG. 4 are formed. In such a manner, the support table 33 is tilted alternately, and the columns 24 each being a stack of eight columnar pieces 24a, 24b, 24c, 24d, 24e, 24f, 24g and 24h as shown in FIG. 4 are simultaneously formed on the surfaces of the protrusions 22. The negative electrode active material layer 23 is thus obtained.

In the case where no raw material gas is supplied from the nozzle 34, the columns 24 composed only of the raw material of alloy-formable active material are formed. In the case where the negative electrode current collector 12a is used in place of the negative electrode current collector 21, and the support table 33 is not tilted and fixed horizontally, the negative electrode active material layer 12b is formed.

Second Embodiment

FIG. 5 is a longitudinal cross-sectional view schematically showing the configuration of a negative electrode 25 included in a non-aqueous electrolyte secondary battery according to a second embodiment of the present invention, the negative electrode 25 including a resin layer 28 with lithium ion conductivity (hereinafter referred to as a "resin layer 28"). For convenience of explanation, on the sheet of FIG. 5, the negative electrode current collector 21 is regarded as located at the lowest portion, and the resin layer 28 is regarded as located at the highest portion. The negative electrode 25 is analogous to the negative electrode 23 of the first embodiment, and the same components are denoted by the same reference numerals, the descriptions of which are omitted. The negative electrode 25 includes the negative electrode current collector 21, a negative electrode active material layer 26, and the resin layer 28 formed on the surface of the negative electrode active material layer 26. The negative electrode 25 has two significant features, and has the same configuration as that of the negative electrode 23, except the two significant features.

The first feature is that the negative electrode active material layer 26 includes a plurality of spindle-shaped columns 27 including an alloy-formable active material. The surface of the negative electrode active material layer 26 has a portion on which the column 27 is present and a portion on which the column 27 is not present, the portions appearing alternately. The alternate presence of these portions serves as apparent roughness. Gaps are present between a pair of the columns 27 adjacent to each other. The roughness and gaps allow the anchor effect to work effectively, further improving the adhesion between the negative electrode active material layer 26 and the resin layer 28.

The axis-to-axis distance between a pair of the columns 27 adjacent to each other is preferably 10 to 100 μm, and more preferably 60 to 100 μm. This allows the resin solution to smoothly enter the gaps between the columns 27, making it possible to easily form the resin layer 28 between the columns 27. The axis of the column 27 is a virtual line passing through the center of the contact surface of the column 27 with the surface of the protrusion 22 and extending perpendicularly to the surface 21a. The center of the contact surface is a center of the smallest circle that can enclose the contact surface.

By forming the columns 27 into a spindle shape, a comparatively large space is allocated around the protrusions 22. The space absorbs expansion and contraction of the alloy-formable active material included in the columns 27. Because of this, cracks are unlikely to occur in the columns 27 even when the number of charge/discharge cycles is increased. Therefore, the generation of by-product and gas due to the contact between the newly-created surfaces and the non-aqueous electrolyte, the wasted consumption of the non-aqueous electrolyte, and the like are prevented, causing no deterioration in various battery performances.

If the axis-to-axis distance between the columns 27 is too small, there is a possibility that the resin solution cannot smoothly enter the gaps between the columns 27 and that the volumetric expansion of the alloy-formable active material cannot be reduced or absorbed. If the axis-to-axis distance is too large, the number of the columns 27 is decreased, causing a possibility of the reduction in the capacity of the negative electrode 25. The spindle-shaped columns 27 can be formed by adjusting the tilting angle of the support table 33 and the number of stacked columnar pieces in the electron beam vapor deposition apparatus 30 shown in FIG. 7.

The second feature is that the resin layer 28 not only stays at the surface of the negative electrode active material layer 26 but also enters the gaps between a pair of the columns 27 adjacent to each other. The resin layer 28 is present only in the upper part of the gaps between the columns 27 and does not reach the surface 21a of the negative electrode current collector 21. This allows the anchor effect of the gaps between the columns 27 to work sufficiently. As a result, the adhesion between the negative electrode active material layer 26 and the resin layer 28 is further improved. In addition, the deterioration in the battery cycle characteristics, the output characteristics and the like is remarkably prevented. The resin layer 28 has the same configuration as the resin layer 13.

The resin layer 28 including an additive for non-aqueous electrolyte is formed almost over the entire top surface of the columns 27. The total of the surface areas of the columns 27 is larger than the surface area of the film-like negative electrode active material layer comprising an alloy-formable active material. This means that the contact area of the resin layer 28 with the columns 27 is large, which more significantly improves the battery performance such as the cycle characteristics.

Third Embodiment

FIG. 6 is a longitudinal cross-sectional view schematically showing the configuration of a negative electrode 29 included in a non-aqueous electrolyte secondary battery of a third embodiment of the present invention. For convenience of explanation, on the sheet of FIG. 6, the negative electrode current collector 21 is regarded as located at the lowest portion, and a resin layer 28a with lithium ion conductivity (hereinafter referred to as a "resin layer 28a") is regarded as located at the highest portion. The negative electrode 29 is analogous to the negative electrode 25, and the same components are denoted by the same reference numerals as in the negative electrode 25, the descriptions of which are omitted.

In the negative electrode 29, the resin layer 28a enters the gaps between a pair of the columns 27 adjacent to each other and reaches the surface 21a of the negative electrode current collector 21. Specifically, the gaps between the columns 27 are filled with the resin layer 28a. The resin layer 28a has the same configuration as the resin layers 13 and 28. This provides the same effect as the negative electrode 25. Further, since the gaps between the columns 27 are filled with the resin layer 28a, the adhesion between the negative electrode active material layer 26 and the resin layer 28a is further improved.

In addition, the resin layer 28a has flexibility and, therefore, can follow the changes in volume of the alloy-formable active material. As such, the resin layer 28a is effective in suppressing the occurrence of inconveniences associated with the changes in volume of the alloy-formable active material. The inconveniences include the separation of the column 27 from the protrusion 22, the deformation of the negative electrode current collector 21, the appearance of newly-created surfaces, and the deposition of lithium on the surface 21a of the negative electrode current collector.

According to this embodiment, it is possible to achieve both a high level of prevention of the contact of the newly-created surfaces with the non-aqueous electrolyte and a high level of reduction or absorption of the changes in volume of the alloy-formable active material. Further, since the contact area of the resin layer 28a including an additive for non-aqueous electrolyte with the columns 27 becomes larger as in the negative electrode 25 of FIG. 5, the effect of the additive for non-aqueous electrolyte is exerted more effectively.

The resin layer 28a is formed so as to fill the gaps between the columns 27 in this embodiment, but not limited thereto, and may be formed, for example, on the surfaces of the columns 27 only. In this case, it is preferable to decrease the thickness of the resin layer so that the gaps are present between the columns 27.

Although the description is made in the above embodiments with reference to the non-aqueous electrolyte secondary battery 1 including a stacked electrode assembly, this is not a limitation, and the non-aqueous electrolyte secondary battery of the present invention may include a wound electrode assembly or a flat electrode assembly. The wound electrode assembly is an electrode assembly obtained by winding a positive electrode and a negative electrode with a lithium ion-permeable insulating layer interposed therebetween. The flat electrode assembly is an electrode assembly obtained by, for example, press-molding a wound electrode assembly into a flat shape. Alternatively, the flat electrode assembly may be formed by winding around a plate a positive electrode and a negative electrode with a lithium ion-permeable insulating layer interposed therebetween.

The shape type of the non-aqueous electrolyte secondary battery of the present invention includes a cylindrical type, a prismatic type, a flat type, a coin type, and a laminate film pack type.

EXAMPLES

The present invention is specifically described below with reference to Examples, Comparative Examples, and Experimental Examples.

Example 1

(1) Preparation of Positive Electrode Active Material

To an aqueous $NiSO_4$ solution, cobalt sulfate was added such that Ni:Co=8.5:1.5 (molar ratio), to prepare an aqueous solution having a metal ion concentration of 2 mol/L. To the resultant aqueous solution, a 2 mol/L sodium hydroxide solution was gradually added dropwise to neutralize the solution, thereby to form a binary precipitate represented by $Ni_{0.85}Co_{0.15}(OH)_2$. The precipitate was collected by filtration, washed with water, and dried at 80° C., to give a composite hydroxide.

The resultant composite hydroxide was heated at 900° C. in air for 10 hours, to give a composite oxide represented by $Ni_{0.85}Co_{0.15}O_2$. Subsequently, the composite oxide was mixed with a monohydrate of lithium hydroxide such that the total number of Ni and Co atoms became equal to the number of Li atoms, and heated at 800° C. in air for 10 hours, whereby a lithium-nickel-containing composite oxide being represented by $LiNi_{0.85}Co_{0.15}O_2$ and comprising secondary particles having an volumetric average particle diameter of 10 μm was obtained as a positive electrode active material.

(2) Production of Positive Electrode

First, 93 g of the positive electrode active material powder obtained in the above, 3 g of acetylene black (conductive agent), 4 g of polyvinylidene fluoride powder (binder), and 50 mL of N-methyl-2-pyrrolidone were mixed sufficiently to prepare a positive electrode material mixture slurry. The positive electrode material mixture slurry thus prepared was applied onto one surface of a 15-μm-thick aluminum foil (positive electrode current collector), then dried and rolled, to form a positive electrode active material layer having a thickness of 120 μm.

(3) Production of Negative Electrode

FIG. 8 is a side view schematically showing the configuration of an electron beam vacuum vapor deposition apparatus 40 (hereinafter simply referred to as a "vapor deposition apparatus 40"). The vapor deposition apparatus 40 includes a chamber 41, a conveying means 42, a gas supplying means 48, a plasma generating means 49, silicon targets 50a and 50b, a masking plate 51, and an electron beam generator (not shown).

The chamber 41 is a pressure-resistant container and accommodates the conveying means 42, the gas supplying means 48, the plasma generating means 49, the silicon targets 50a and 50b, the masking plate 51, and the electron beam generator.

The conveying means 42 includes a supply roller 43, a can 44, a take up roller 45, and guide rollers 46 and 47. The supply roller 43, the can 44, and the guide rollers 46 and 47 are provided so as to be rotatable around their axes. On the supply roller 43, a belt-like negative electrode current collector 12a is wound around. The can 44 has a cooling means (not shown) in its interior. While the negative electrode current collector 12a is being conveyed on the surface of the can 44, the negative electrode current collector 12a is cooled, and then the alloy-formable active material precipitates on the surface of the negative electrode current collector 12a, whereby a film-like negative electrode active material layer including the alloy-formable active material is formed.

The take up roller 45 is provided rotatably around its axis by a driving means (not shown). One end of the negative electrode current collector 12a is fixed onto the take up roller 45, and by the rotation of the take up roller 45, the negative electrode current collector 12a is supplied from the supply roller 43 and transferred via the guide roller 46, the can 44, and the guide roller 47. Then, the negative electrode 12 including a film-like negative electrode active material layer formed on the surface of the negative electrode current collector 12a is taken up on the take up roller 45.

The gas supplying means 48 supplies a raw material gas such as oxygen and nitrogen into the chamber 41. The plasma generating means 49 allows the raw material gas supplied from the gas supplying means 48 to form plasma thereof. The silicon targets 50a and 50b are used for forming a film-like negative electrode active material layer containing silicon. The masking plate 51 is provided movably in the horizontal direction between the can 44 and the silicon targets 50a and 50b. The position in the horizontal direction of the masking plate 51 is appropriately adjusted according to the growing state of the film-like negative electrode active material layer. The electron beam generator irradiates the silicon targets 50a and 50b with electron beams, to generate vapor of silicon therefrom.

A film-like negative electrode active material layer (a silicon thin film, a solid film) having a thickness of 6 µm was formed on the surface of the negative electrode current collector 12a under the following conditions by using the vapor deposition apparatus 40, thereby to produce the negative electrode 12.

Pressure in chamber 41: $8.0 \times 10^{-5}$ Torr

Negative electrode current collector 12a:

Electrolytic copper foil of 50 m in length, 10 cm in width and 35 µm in thickness (available from FURUKAWA CIRCUIT FOIL Co., Ltd.)

Rate of taking up of negative electrode current collector 12a: 2 cm/min

Raw material gas: Not supplied

Targets 50a and 50b: Single crystal silicon with 99.9999% purity (available from Shin-Etsu Chemical Co., Ltd.)

Accelerating voltage of electron beams: −8 kV

Emission of electron beams: 300 mA

The obtained negative electrode 12 was cut in the size of 35 mm×35 mm, to give a negative electrode plate. Lithium metal was vapor deposited on the film-like negative electrode active material layer of the negative electrode plate, to supplement lithium in an amount equivalent to the irreversible capacity stored during initial charge and discharge. The vapor deposition of lithium metal was performed by using a resistance heating vapor deposition apparatus (available from ULVAC, Inc.) in the following manner. Lithium metal was placed on the tantalum boat in the resistance heating vapor deposition apparatus, and the negative electrode plate was fixed such that the film-like negative electrode active material layer faced the tantalum boat. Vapor deposition was carried out for 10 minutes in an argon atmosphere, while a current of 50 A was being allowed to flow through the tantalum boat.

(4) Formation of Lithium Ion-Conductive Resin Layer

A fluorocarbon resin being a copolymer of VDF and HFP (VDF:HFP=88:12 (mass %)) was dissolved in the dimethyl carbonate, and to the resultant solution, vinylene carbonate (hereinafter referred to as "VC") was added and heated to 80° C., to prepare a resin solution. A resin layer formed from this resin solution is brought into contact with non-aqueous electrolyte in the later process, and thereby becomes a lithium ion-conductive resin layer. The concentrations of the fluorocarbon resin and VC in the resin solution were adjusted such that the contents of the fluorocarbon resin and VC in the lithium ion-conductive resin layer became 5% by mass and 2% by mass, respectively.

The negative electrode plate on which lithium metal was vapor deposited was immersed in the resin solution (80° C., viscosity 70 cps) for 1 minute. Thereafter, the negative electrode plate was taken out from the resin solution, placed on a glass plate, and dried with hot air at 80° C. for 10 minutes. The resultant negative electrode plate was observed under a laser microscope. The result found that a resin layer having a thickness of about 2 µm was formed on the surface of the negative electrode plate. The attached amount of the resin layer was 0.34 mg/cm$^2$. As describe above, this resin layer is brought into contact with non-aqueous electrolyte and swells, and thereby becomes a lithium ion-conductive resin layer.

(5) Fabrication of Stacked Battery

The positive electrode plate and the negative electrode plate obtained in the above were respectively cut in the size of 1.5 cm×1.5 cm. Thereafter, the positive electrode plate and the negative electrode plate were stacked with a 20-µm-thick polyethylene microporous film (separator, trade name: Hipore, available from Asahi Kasei Corporation) interposed therebetween, to form an electrode assembly. One end of an aluminum lead was welded to the positive electrode current collector, and one end of a nickel lead was welded to the negative electrode current collector.

The electrode assembly thus obtained was inserted into a housing case (size 2 cm×2 cm) made of laminate film. Subsequently, 0.5 mL of liquid non-aqueous electrolyte was injected into the housing case. The resin layer on the surface of the negative electrode plate was thus impregnated with the liquid non-aqueous electrolyte. For the liquid non-aqueous electrolyte, a non-aqueous electrolyte obtained by dissolving LiPF$_6$ at a concentration of 1.0 mol/L in a mixed solvent of ethylene carbonate and ethyl methyl carbonate at a volume ratio of 1:1 was used.

Next, the other ends of the aluminum lead and nickel lead were extended outside through the openings at both ends of the housing case, respectively. The openings of the housing case were welded while the internal pressure in the housing case was reduced to a near vacuum. A non-aqueous electrolyte secondary battery was thus fabricated.

Example 2

A non-aqueous electrolyte secondary battery was fabricated in the same manner as in Example 1, except that a negative electrode produced in the manner as described below was used.

[Production of Negative Electrode]

Chromium oxide was flame-sprayed on the surface of a 50-mm-diameter iron roller, to form a ceramic layer having a thickness of 100 µm. Circular recesses each having a diameter of 12 µm and a depth of 8 µm were formed on the surface of the ceramic layer by laser machining, to produce a protrusion-forming roller. The recesses were arranged in a staggered pattern, and the axis-to-axis distance between a pair of adjacent recesses was 20 µm. The bottom of the recess was almost flat at its center and round at the boundary between the periphery of the bottom and the side wall.

An alloy copper foil (trade name: HCL-02Z, thickness: 20 µm, available from Hitachi Cable) containing 0.03% by mass of zirconium was heated in an argon gas atmosphere at 600° C. for 30 minutes for annealing. The resultant alloy copper foil was passed through the press-contact portion at which the protrusion-forming roller obtained in the above and a 50-mm-diameter iron roller with smooth surface were press-fitted to each other, at a line pressure of 2 t/cm. A negative electrode current collector having protrusions on one surface thereof in the thickness direction was thus produced.

A cross section of the negative electrode current collector thus produced in its thickness direction was observed under a scanning electron microscope. The result found that protrusions were formed on the surface of the negative electrode current collector. The average height of the protrusions was about 6 μm. Subsequently, the surfaces of the protrusions were electrolytically plated, to attach a plurality of copper particles having a diameter of about 2 μm onto the surfaces of the protrusions. The average height of the protrusions of the finally obtained negative electrode current collector with copper particles attached thereon was about 8 μm. By attaching copper particles on the surfaces of the protrusions, the bonding strength between the below-described columns and the protrusions was improved. This negative electrode current collector was cut in the size of 20 mm×100 mm.

Columns were formed on the surfaces of the above-formed protrusions on the negative electrode current collector using a commercially available vapor deposition apparatus (available from ULVAC, Inc.) having the same structure as the electron beam vapor deposition apparatus 30 as shown in FIG. 7. A film-like negative electrode active material layer including a plurality of columns was thus formed. The vapor deposition conditions were as follows. The support table on which a negative electrode current collector was fixed was set so as to alternately move between a position where an angle α formed with the horizontal line was 60° (the position indicated by the solid line in FIG. 7) and a position where an angle (180−α) was 120° (the position indicated by the dash-dot line in FIG. 7). Under such setting, a plurality of columns each formed of eight columnar pieces as shown in FIG. 3 or 4 were formed. Each column was grown so as to extend outward from the top of the protrusion and the side surface near the top of the protrusion on the negative electrode current collector.

Raw material of negative electrode active material (evaporation source): Silicon with 99.9999% purity, available from Kojundo Chemical Laboratory Co., Ltd.

Oxygen released from nozzle: Oxygen with 99.7% purity, available from Nippon Sanso Corporation Flow rate of oxygen released from nozzle: 80 sccm Angle α: 60°

Accelerating voltage of electron beams: −8 kV

Emission: 500 mA

Duration of vapor deposition: 3 min

A cross section of the produced negative electrode in its thickness direction was observed under a scanning electron microscope to measure the lengths of ten columns (the length from the top of the protrusion to the top of the column), and the measured values were averaged. The obtained average was defined as the thickness of the film-like negative electrode active material layer, which was 22 μm. The content of oxygen in the film-like negative electrode active material layer was determined by a combustion method. The result found that the columns had a composition of $SiO_{0.5}$.

Lithium metal was vapor deposited on the surface of the film-like negative electrode active material layer in the same manner as in Example 1, to supplement lithium in an amount equivalent to the irreversible capacity stored in the film-like negative electrode active material layer during initial charge and discharge.

Comparative Example 1

A non-aqueous electrolyte secondary battery was fabricated in the same manner as in Example 1, except that a lithium ion-conductive resin layer was not formed.

Experimental Example 1

The non-aqueous electrolyte secondary batteries of Examples 1 to 2 and Comparative Example 1 were subjected to evaluation tests as described below.

[Cycle Characteristic]

With respect to each of the batteries of Examples 1 to 2 and Comparative Example 1, the first charge/discharge cycle consisting of a constant current charge, a constant voltage charge and a constant current discharge was performed in a 20° C. environment under the following conditions. The discharge capacity at the first cycle was defined as an initial discharge capacity. Here, 1 C is a value of current at which the whole battery capacity can be consumed in 1 hour.

Constant current charge: Charge current 0.7 C, Charge cutoff voltage 4.2 V

Constant voltage charge: Charge voltage 4.2 V, Charge cutoff current 0.05 C

Constant current discharge: Discharge current 0.2 C, Discharge cutoff voltage 2.5 V Thereafter, charge/discharge was repeated to a total of 98 cycles in the same manner as in the above, except that the discharge current in the constant current discharge was changed from 0.2 C to 1 C. The 100th charge/discharge cycle was performed under the same conditions as the first charge/discharge cycle. The discharge capacity at the 100th cycle was defined as a discharge capacity after 100 cycles.

The ratio of the discharge capacity after 100 cycles to the initial discharge capacity was calculated as a percentage, which was defined as a capacity retention rate (%). The results are shown in Table 1.

[Battery Swelling]

The thickness T of the electrode assembly after 100 cycles and the thickness $T_0$ of the electrode assembly before evaluation of cycle characteristics were measured, and a battery swelling (%) was calculated from the following equation. The results are shown in Table 1.

$$\text{Battery swelling (\%)}=[(T-T_0)/T_0]\times 100$$

TABLE 1

|  | Capacity retention rate (%) | Battery swelling (%) |
| --- | --- | --- |
| Example 1 | 92 | 17 |
| Example 2 | 95 | 8 |
| Comparative Example 1 | 60 | 100 |

Table 1 shows that, in the batteries of Examples 1 and 2, the cycle characteristics maintained at a high level even after 100 cycles, and the battery swelling was suppressed. This was presumably because a lithium ion-conductive resin layer was formed on the surface of the film-like negative active material layer, and thus, even when cracks occurred in the alloy-formable active material, and newly-created surfaces appeared, the lithium ion-conductive resin layer prevented the contact of the newly-created surfaces with the non-aqueous electrolyte.

The comparison between Example 1 and Example 2 shows that in the case where the film-like negative electrode active material layer was not a solid film but a film comprising a plurality of columns, the cycle characteristics maintained at a higher level, and the battery swelling was more suppressed. This was presumably because the film-like negative electrode active material layer included a plurality of columns, and thus, the adhesion between the film-like negative electrode active material layer and the lithium ion-conductive resin layer was further improved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The non-aqueous electrolyte secondary battery of the present invention is applicable for the same applications as those of the conventional non-aqueous electrolyte secondary batteries, and is particular useful as a main power source or auxiliary power source for electronic equipment, electric equipment, machining equipment, transportation equipment, power storage equipment, and the like. Examples of the electronic equipment include personal computers, cellular phones, mobile devices, personal digital assistants, portable game machines and the like. Examples of the electric equipment include vacuum cleaners, video cameras and the like. Examples of the machining equipment include electric tools, robots and the like. Examples of the transportation equipment include electric vehicles, hybrid electric vehicles, plug-in HEVs, fuel cell-powered vehicles and the like. Examples of the power storage equipment include uninterrupted power supplies and the like.

The invention claimed is:

1. A negative electrode for a non-aqueous electrolyte secondary battery comprising:
   a negative electrode current collector;
   a negative electrode active material layer being supported on a surface of the negative electrode current collector and including an alloy-formable active material capable of absorbing and desorbing lithium ions; and
   a resin layer formed on a surface of the negative electrode active material layer, the resin layer including a resin component with lithium ion conductivity and an additive for non-aqueous electrolyte, wherein:
   the additive for non-aqueous electrolyte includes at least one selected from the group consisting of a carbonate compound, a sulfur-containing cyclic compound, an acid anhydride and a nitrile compound, and
   the carbonate compound is at least one selected from the group consisting of vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate, fluoroethylene carbonate, divinylethylene carbonate, and trifluoropropylene carbonate.

2. The negative electrode for a non-aqueous electrolyte secondary battery in accordance with claim 1, wherein a content of the additive for non-aqueous electrolyte is 0.1 to 50% by mass of a total mass of the resin layer.

3. The negative electrode for a non-aqueous electrolyte secondary battery in accordance with claim 1, wherein the sulfur-containing cyclic compound includes in the molecule thereof a group $=SO_2$ and an oxygen atom other than oxygen atoms contained in the group $=SO_2$.

4. The negative electrode for a non-aqueous electrolyte secondary battery in accordance with claim 1, wherein the sulfur-containing cyclic compound is at least one selected from the group consisting of ethylene sulfite and sultones.

5. The negative electrode for a non-aqueous electrolyte secondary battery in accordance with claim 1, wherein the sulfur-containing cyclic compound is at least one selected from the group consisting of 1,3-propanesultone, 1,4-butanesultone, 1,3-propenesultone, and 1,4-butenesultone.

6. The negative electrode for a non-aqueous electrolyte secondary battery in accordance with claim 1, wherein the acid anhydride is at least one selected from succinic anhydride and maleic anhydride.

7. The negative electrode for a non-aqueous electrolyte secondary battery in accordance with claim 1, wherein the nitrile compound is succinonitrile.

8. The negative electrode for a non-aqueous electrolyte secondary battery in accordance with claim 1, wherein the resin component with lithium ion conductivity includes at least one selected from the group consisting of fluorocarbon resin, polyacrylonitrile, polyethylene oxide, and polypropylene oxide.

9. The negative electrode for a non-aqueous electrolyte secondary battery in accordance with claim 1, wherein the resin layer has a thickness of 0.1 to 10 μm.

10. The negative electrode for a non-aqueous electrolyte secondary battery in accordance with claim 1, wherein the negative electrode active material layer comprises an aggregate of a plurality of columns of the alloy-formable active material supported on the surface of the negative electrode current collector.

11. The negative electrode for a non-aqueous electrolyte secondary battery in accordance with claim 1, wherein the alloy-formable active material includes at least one selected from a silicon-based active material and a tin-based active material.

12. A non-aqueous electrolyte secondary battery comprising: a positive electrode capable of absorbing and desorbing lithium ions, a negative electrode capable of absorbing and desorbing lithium ions, a lithium ion-permeable insulating layer interposed between the positive electrode and the negative electrode, and a lithium ion-conductive non-aqueous electrolyte, wherein
   the negative electrode is the negative electrode of claim 1.

* * * * *